US012747666B2

(12) United States Patent
Langlois et al.

(10) Patent No.: US 12,747,666 B2
(45) Date of Patent: Sep. 29, 2026

(54) TURBINE ENGINE WITH A BLADE ASSEMBLY HAVING COOLING HOLES

(71) Applicant: GENERAL ELECTRIC COMPANY, Schenectady, NY (US)

(72) Inventors: Emily K. Langlois, Loveland, OH (US); Brian Patrick Peterson, Madeira, OH (US); Haidong Liu, Weston, MA (US); Lauren Rose Watson, West Chester, OH (US); Daniel Endecott Osgood, Loveland, OH (US)

(73) Assignee: General Electric Company, Evendale, OH (US)

( * ) Notice: Subject to any disclaimer, the term of this patent is extended or adjusted under 35 U.S.C. 154(b) by 228 days.

(21) Appl. No.: 18/665,668

(22) Filed: May 16, 2024

(65) Prior Publication Data

US 2026/0022640 A1 Jan. 22, 2026

Related U.S. Application Data

(60) Provisional application No. 63/502,556, filed on May 16, 2023.

(51) Int. Cl.
*F01D 5/18* (2006.01)
*F01D 5/14* (2006.01)

(52) U.S. Cl.
CPC ............. *F01D 5/186* (2013.01); *F01D 5/141* (2013.01); *F05D 2260/202* (2013.01)

(58) Field of Classification Search
CPC ..... F01D 5/186; F01D 5/187; F05D 2260/202
See application file for complete search history.

(56) References Cited

U.S. PATENT DOCUMENTS

| | | | | |
|---|---|---|---|---|
| 5,819,524 | A * | 10/1998 | Bosley | F01D 5/04 415/55.1 |
| 7,186,085 | B2 | 3/2007 | Lee | |
| 7,682,132 | B2 | 3/2010 | Sugimoto et al. | |
| 8,016,547 | B2 * | 9/2011 | Propheter-Hinckley | F01D 5/188 415/115 |
| 9,416,665 | B2 | 8/2016 | Xu et al. | |
| 9,464,528 | B2 | 10/2016 | Zhang | |
| 9,708,915 | B2 | 7/2017 | Barr | |
| 10,570,747 | B2 | 2/2020 | Rudolph | |
| 10,760,431 | B2 | 9/2020 | Webster et al. | |
| 11,028,699 | B2 | 6/2021 | Lee | |
| 11,180,996 | B2 * | 11/2021 | Brady | F01D 5/288 |
| 11,199,096 | B1 * | 12/2021 | Papple | F01D 5/141 |
| 11,220,921 | B2 * | 1/2022 | Harding | F01D 25/12 |
| 11,261,737 | B1 * | 3/2022 | Snyder | F01D 5/28 |
| 11,313,236 | B2 * | 4/2022 | Mottram | F01D 5/186 |
| 11,359,494 | B2 | 6/2022 | Osgood et al. | |
| 11,506,062 | B2 | 11/2022 | Kim et al. | |

(Continued)

*Primary Examiner* — Courtney D Heinle
*Assistant Examiner* — Behnoush Haghighian
(74) *Attorney, Agent, or Firm* — Hanley, Flight & Zimmerman, LLC

(57) ABSTRACT

A turbine engine includes an engine core extending along an engine centerline and includes a compressor section, a combustor, and a turbine section in serial flow arrangement. A set of blades are circumferentially arranged in the turbine section and the compressor section. Each blade including cooling holes arranged in an overlapping region of the blade.

12 Claims, 7 Drawing Sheets

(56) References Cited

U.S. PATENT DOCUMENTS

| | | | | |
|---|---|---|---|---|
| 11,986,897 | B2 * | 5/2024 | Kell | B23K 26/035 |
| 2010/0040459 | A1 | 2/2010 | Ohkita | |
| 2016/0237850 | A1 | 8/2016 | Chakka | |
| 2016/0245094 | A1 | 8/2016 | Bunker et al. | |
| 2019/0323359 | A1 * | 10/2019 | Ireland | F01D 5/189 |
| 2020/0224875 | A1 * | 7/2020 | Murray | F23R 3/002 |

* cited by examiner

TURBINE ENGINE WITH A BLADE ASSEMBLY HAVING COOLING HOLES

CROSS-REFERENCE TO RELATED APPLICATIONS

This application claims priority to U.S. Provisional Patent Application No. 63/502,566, filed May 16, 2023, which is hereby incorporated by reference in its entirety.

TECHNICAL FIELD

The present subject matter relates generally to a blade assembly for a turbine engine, and more specifically to a blade with cooling holes.

BACKGROUND

A gas turbine engine typically includes a turbomachine, with a fan in some implementations. The turbomachine generally includes a compressor, combustor, and turbine in serial flow arrangement. The compressor compresses air which is channeled to the combustor where it is mixed with fuel. The mixture is then ignited to generate hot combustion gases. The combustion gases are channeled to the turbine, which extracts energy from the combustion gases for powering the compressor and fan, if used, as well as for producing useful work to propel an aircraft in flight or to power a load, such as an electrical generator.

During operation of the gas turbine engine, various systems generate a relatively large amount of heat and stress. For example, a substantial amount of heat or stress can be generated during operation of the thrust generating systems, lubrication systems, electric motors and/or generators, hydraulic systems or other systems. A design that mitigates heat loads and/or stresses on an engine component is advantageous.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
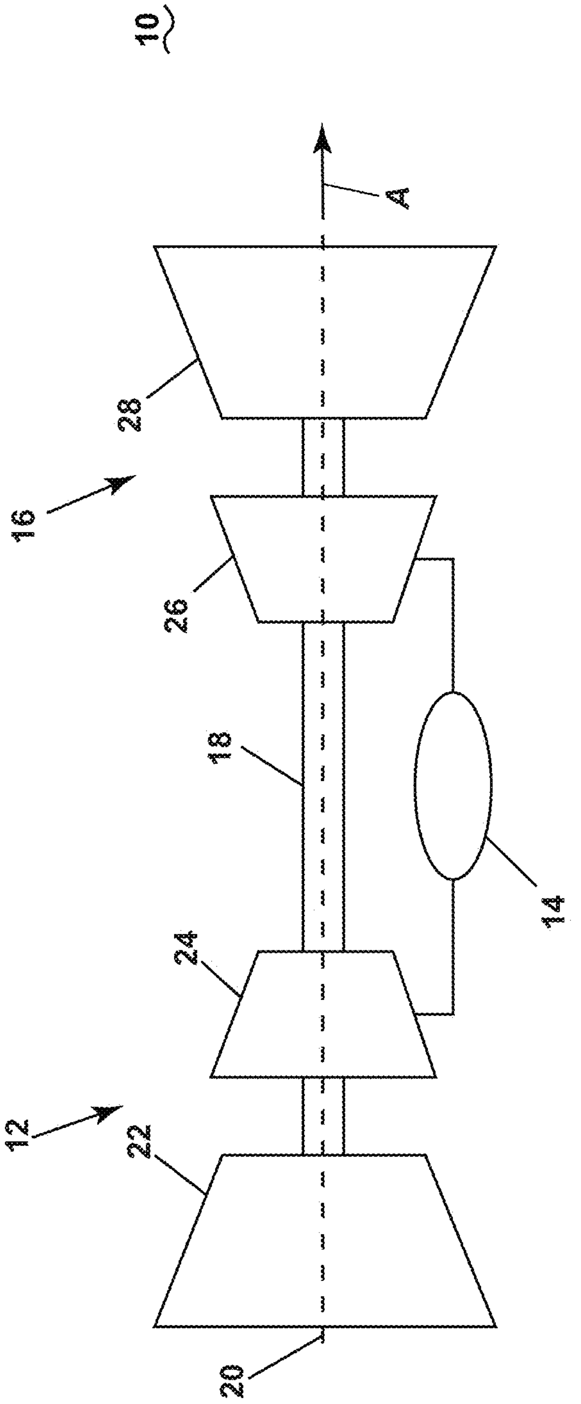
FIG. 1 is a schematic cross-sectional view of a gas turbine engine, in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Aspects of the disclosure generally relate to a blade assembly for a turbine engine. The blade assembly includes cooled turbine engine blades. Traditional blades often include cooling holes arranged in an overlapping region proximate to and/or along a trailing edge of the blade. High engine temperatures and operational forces impart relatively large thermal and mechanical stresses on the blades. In addition, cooling holes in the blade create stress concentrations. Relatively large stresses can contribute to an unexpected or premature part replacement. Cooling holes having certain orientations can exacerbate stress concentrations at the overlapping region. There is a need for a blade with greater durability to increase time on wing.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

As may be used herein, the terms “first”, “second”, “third”, and “fourth” can be used interchangeably to distinguish one component from another and are not intended to signify location or importance of the individual components.

A “set” or a set of elements as used herein can include any number of said elements, including one.

The terms “forward” and “aft” as may be used herein refer to relative positions within a gas turbine engine and refer to the normal operational attitude or direction of travel of the gas turbine engine. For example, with regard to a gas turbine engine, forward refers to a position relatively closer to the nose of an aircraft and aft refers to a position relatively closer to a tail of the aircraft.

The terms “upstream” and “downstream” refer to a direction with respect to a direction of fluid flow along a flowpath.

The term “fluid” refers to a gas or a liquid.

The singular forms “a”, “an”, and “the” include plural references unless the context clearly dictates otherwise.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader’s understanding of the present disclosure, and do not create limitations, particularly as to the position, orientation, or use of aspects of the disclosure described herein.

Connection references (e.g., attached, coupled, connected, and joined) are to be construed broadly and can include intermediate structural elements between a collection of elements and relative movement between elements unless otherwise indicated. As such, connection references do not necessarily infer those two elements are directly connected and in fixed relation to one another. The exemplary drawings are for purposes of illustration only and the dimensions, positions, order and relative sizes reflected in the drawings attached hereto can vary.

As used herein, a "stage" of either the compressor or turbine is a set of blades and an adjacent set of vanes, with both sets of the blades and vanes circumferentially arranged about an engine centerline. The blades rotate relative to the engine centerline and, in one example, are mounted to a rotating structure, such as a disk, to affect the rotation. A pair of circumferentially-adjacent vanes in the set of vanes are referred to as a nozzle.

A rotational axis (denoted A) refers to an axis about which the turbine engine rotates and is aligned with the engine centerline.

A radial axis (denoted R) refers to an axis that extends perpendicular to the rotational axis A and is aligned with a height dimension of a blade assembly.

As used herein, "axial," "axially," or "axial direction" refers to a location or direction with respect to the rotational axis A.

As used herein, "radial," "radially," or "radial direction" refers to a location or direction with respect to the radial axis R.

A reference plane is perpendicular to the radial axis R and includes the rotational axis A.

As used herein, the term "radial distance" refers to a distance measured from the rotational axis A along the radial axis R or parallel to the radial axis R.

As used herein, "circumferential," "circumferentially," or "circumferential direction" refers to an annular dimension circumscribing the rotational axis A.

"Tip plane," as used herein, is a plane that is perpendicular to the radial axis R and includes a tip point on a tip of a blade. The tip point is defined as a point on the tip of the blade.

"Platform plane," as used herein, is a plane that is perpendicular to the radial axis R, parallel to the tip plane, and includes a platform point on a platform exterior surface of a platform. The platform point is defined as a point along the platform exterior surface, where the platform exterior surface is configured to confront the mainstream airflow of the turbine engine.

"Airfoil height" (denoted $H_{airfoil}$), as used herein, represents a height of the blade and is defined as the distance between the platform plane and the tip plane.

A "first radial plane," as used herein, is a plane that is perpendicular to the radial axis R, parallel to the tip plane, and located at a radial distance of 0.369 meters (14.54 inches) from the rotational axis A.

A "second radial plane," as used herein, is a plane that is perpendicular to the radial axis R, parallel to the tip plane, and located at a radial distance of 0.353 meters (13.91 inches) from the rotational axis A.

"Mid-region," as used herein, is a region of a pressure side of the blade that is located between the first radial plane and the second radial plane.

A "blade curve" is defined as a line of intersection between an exterior surface of a pressure side of the blade and the second radial plane. The blade curve extends between the leading edge and the trailing edge of the blade.

"Curve length," as used herein, is a length along the blade curve.

A "curve point" is defined at a distance from the leading edge along the blade curve. The distance is 68% of the curve length, where 0% distance is defined at the leading edge and 100% is defined at a trailing edge.

An aft plane is a plane that includes the curve point, is perpendicular to the second radial plane, and is perpendicular to the blade curve at the curve point.

"Aft region," as used herein, is a region of the pressure side of the blade that is located between the aft plane and the trailing edge.

"Overlapping region," as used herein, is a region of the pressure side of the blade that is common to both the mid-region and the aft region.

"Passage centerline," as used herein, is a centerline of a cooling hole. The cooling hole has an inlet and an outlet and the centerline may be defined as the longitudinal axis for the cooling hole that extends through a center of the inlet and a center of the outlet.

"Radial hole angle," as used herein (denoted RHA), is the angle defined between the second radial plane and the passage centerline. The radial hole angle is the angle between the passage centerline and the projection of the passage centerline onto the second radial plane.

"Radial hole angle average," as used herein (denoted $RHA_{avg}$), is an average of the radial hole angles RHAs for all cooling holes located in the overlapping region.

"Radial hole angle minimum," as used herein (denoted $RHA_{min}$), is the smallest of the radial hole angles RHAs of all the cooling holes located in the overlapping region.

As used herein, "exhaust gas temperature" (denoted EGT) refers to a redline, or maximum permitted takeoff temperature documented in a Federal Aviation Administration ("FAA") type certificate data sheet. For example, in certain exemplary embodiments, the term exhaust gas temperature EGT refers to a maximum permitted takeoff temperature of an airflow after a first stage stator downstream of an HP turbine of an engine. The term exhaust gas temperature EGT is sometimes also referred to as a redline exhaust gas temperature or an indicated turbine exhaust gas temperature or indicated turbine temperature.

"Rotational speed" (denoted N2), as used herein, refers to a redline, or maximum permitted takeoff rotational speed of the turbine engine as documented in the FAA-type certificate data sheet. The rotational speed N2 is the rate at which the drive shaft for the turbine engine rotates, which defines the rotational speed of the particular blade within the engine.

All measurements referred to herein are represent a blade assembly prior to use or as a cold component.

Referring now to the drawings, FIG. 1 is a schematic view of a turbine engine 10. As a non-limiting example, the turbine engine 10 can be used within an aircraft. The turbine engine 10 includes an engine core including, at least, a compressor section 12, a combustor 14, and a turbine section 16. A fan (not shown) provides air to the compressor section 12. A drive shaft 18 rotationally couples the fan, compressor section 12, and turbine section 16, such that rotation of one affects the rotation of the others, and defines an engine centerline 20 for the turbine engine 10. A rotational axis A is defined as an axis about which the turbine engine 10 rotates and is collinear with the engine centerline 20.

The compressor section 12 includes a low-pressure (LP) compressor 22 and a high-pressure (HP) compressor 24 serially fluidly coupled to one another. The turbine section 16 includes an HP turbine 26 and a LP turbine 28 serially fluidly coupled to one another. The drive shaft 18 operatively couples the LP compressor 22, the HP compressor 24, the HP turbine 26, and the LP turbine 28 to one another. In some implementations, the drive shaft 18 includes an LP drive shaft (not illustrated) and an HP drive shaft (not illustrated), where the LP drive shaft couples the LP compressor 22 to the LP turbine 28, and the HP drive shaft couples the HP compressor 24 to the HP turbine 26.

The compressor section 12 includes a plurality of axially spaced stages. Each stage includes a set of circumferentially-spaced rotating blades and a set of circumferentially-spaced stationary vanes. In one configuration, the compressor blades for a stage of the compressor section 12 are mounted to a disk, which is mounted to the drive shaft 18. Each set of blades for a given stage can have its own disk. In one implementation, the vanes of the compressor section 12 are mounted to a casing which extends circumferentially about the turbine engine 10. In a counter-rotating turbine engine, the vanes are mounted to a drum, which is similar to the casing, except the drum rotates in a direction opposite the blades, whereas the casing is stationary. It will be appreciated that the representation of the compressor section 12 is merely schematic. The number of stages can vary.

Similar to the compressor section 12, the turbine section 16 includes a plurality of axially spaced stages, with each stage having a set of circumferentially-spaced, rotating blades and a set of circumferentially-spaced, stationary vanes. In one configuration, the turbine blades for a stage of the turbine section 16 are mounted to a disk which is mounted to the drive shaft 18. Each set of blades for a given stage can have its own disk. In one implementation, the vanes of the turbine section are mounted to the casing in a circumferential manner. In a counter-rotating turbine engine, the vanes can be mounted to a drum, which is similar to the casing, except the drum rotates in a direction opposite the blades, whereas the casing is stationary. The number of blades, vanes and turbine stages can vary.

The combustor 14 is provided serially between the compressor section 12 and the turbine section 16. The combustor 14 is fluidly coupled to at least a portion of the compressor section 12 and the turbine section 16 such that the combustor 14 at least partially fluidly couples the compressor section 12 to the turbine section 16. As a non-limiting example, the combustor 14 is fluidly coupled to the HP compressor 24 at an upstream end of the combustor 14 and to the HP turbine 26 at a downstream end of the combustor 14.

During operation of the turbine engine 10, ambient or atmospheric air is drawn into the compressor section 12 via the fan, upstream of the compressor section 12, where the air is compressed defining a pressurized air. The pressurized air then flows into the combustor 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the turbine engine 10 via an exhaust section (not illustrated) downstream of the turbine section 16. The driving of the LP turbine 28 drives the LP spool to rotate the fan and the LP compressor 22. The pressurized airflow and the combustion gases together define a working airflow that flows through the fan, compressor section 12, combustor 14, and turbine section 16 of the turbine engine 10.

Figure 2:
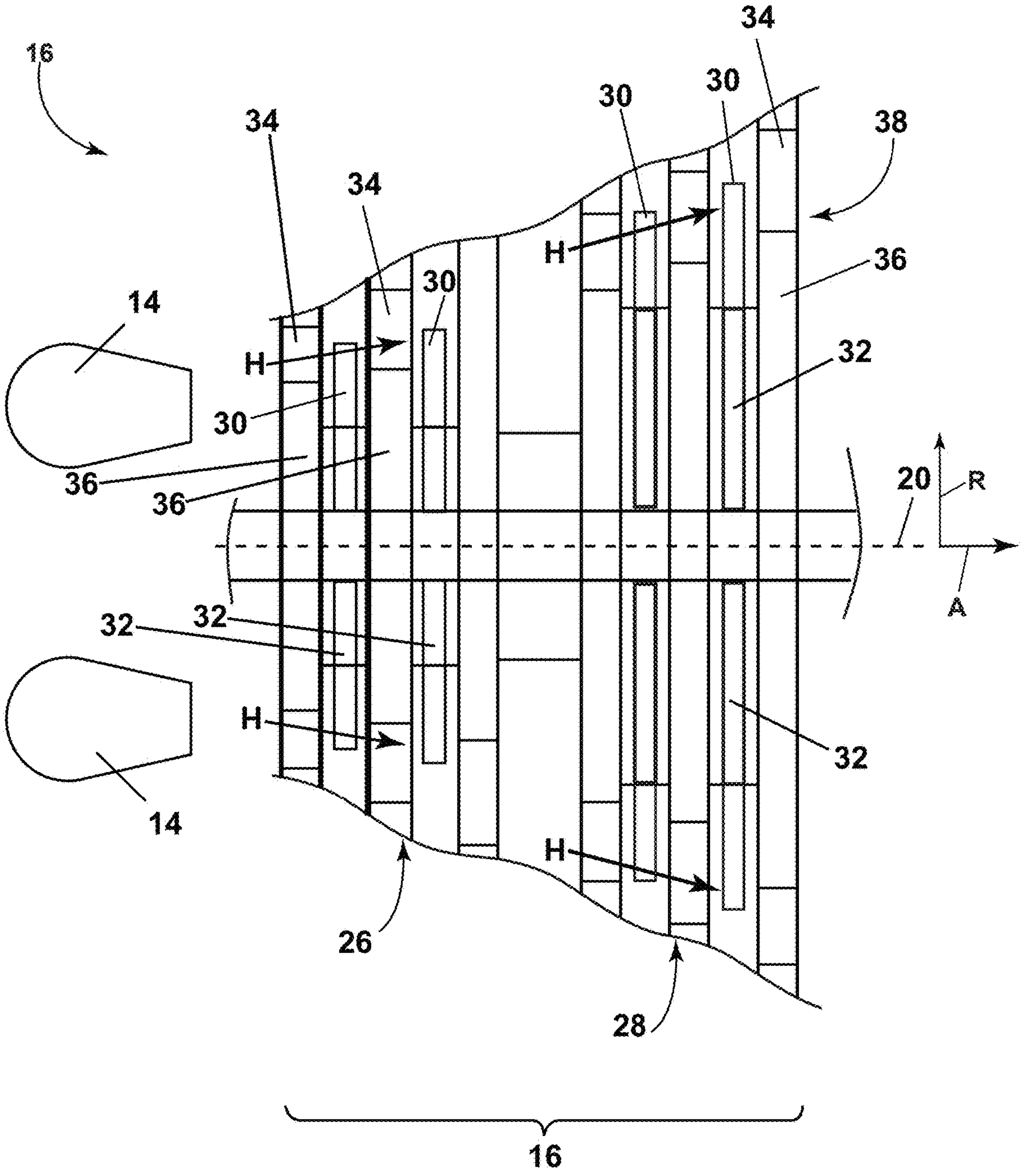
FIG. 2 is a schematic cross-sectional view of the turbine section of the gas turbine engine of FIG. 1, in accordance with an exemplary embodiment of the present disclosure.

Turning to FIG. 2, a portion of the turbine section 16 is schematically illustrated. The turbine section 16 includes sets of blades 30 circumferentially mounted to corresponding disks 32. The number of individual blades of the set of blades 30 mounted to each disk 32 may vary. While shown schematically in FIG. 2, it should be understood that the turbine engine 10 can be a single stage turbine, or can include additional stages as shown.

Stationary vanes 34 are mounted to a stator ring 36 located distally exterior of each of the disks 32. A nozzle 38 is defined by the space between circumferentially-adjacent pairs of stationary vanes 34.

During operation of the turbine engine 10, a flow of hot gas (denoted "H") exits the combustor 14 and enters the turbine section 16. A redline exhaust gas temperature EGT refers to a maximum permitted takeoff temperature of an airflow. For example, the temperature of the airflow may be measured after the stator ring 36 that is positioned at the first stage downstream of the HP turbine 26 (such as at a location at the first blade of the set of blades 30 of the LP turbine 28).

Figure 3:
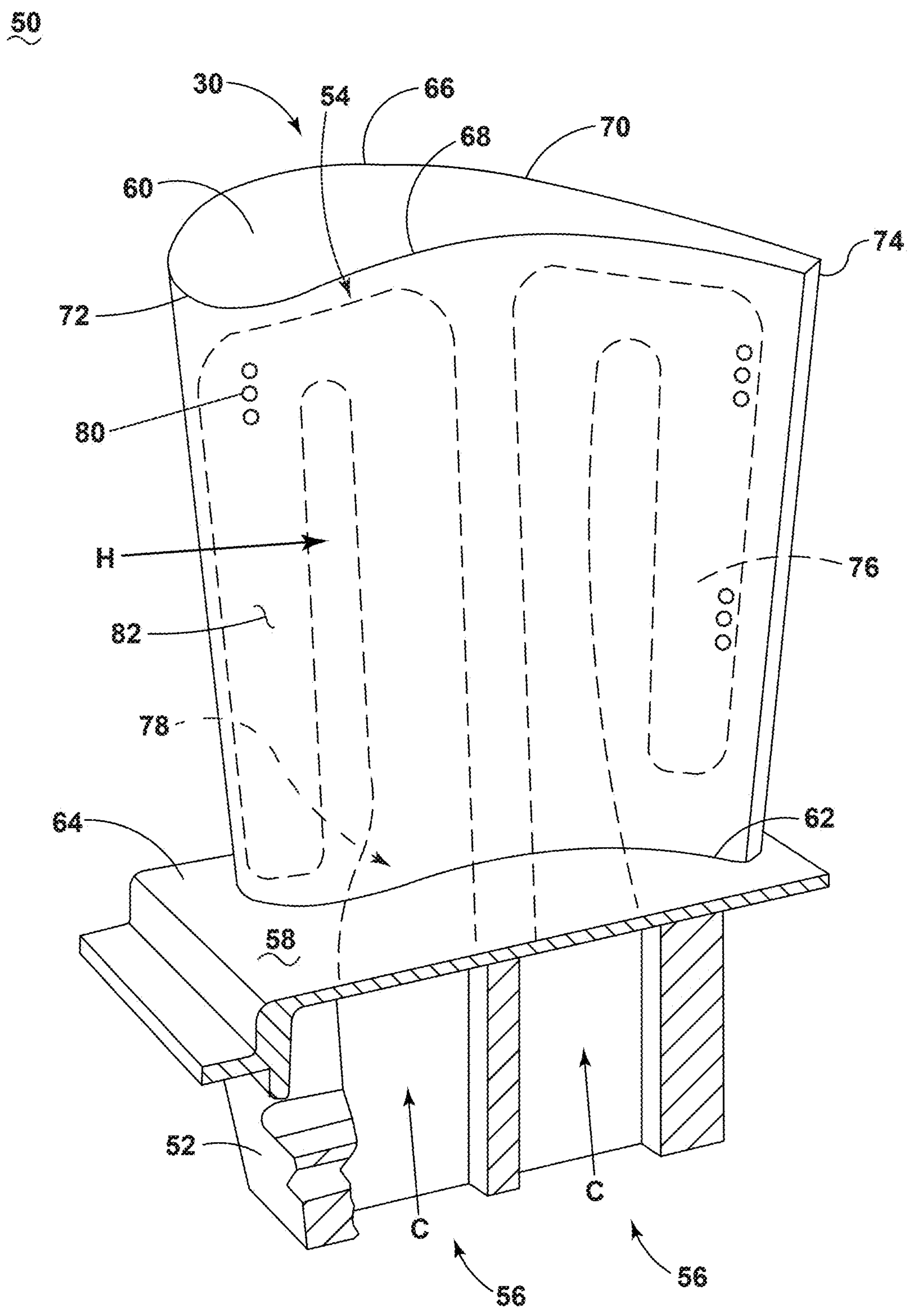
FIG. 3 is a perspective view of a blade assembly for use in the gas turbine engine of FIG. 1, in accordance with an exemplary embodiment of the present disclosure.

FIG. 3 is a perspective view of a blade assembly 50, including one blade 30 of the set of blades 30 (FIG. 2) used in the turbine engine 10 (FIG. 1). The blade assembly 50 includes a dovetail 52, a platform 64, and an airfoil 54 extending from the platform 64 and defining at least a portion of the blade 30. The dovetail 52 further includes at least one inlet passage 56, shown as two exemplary inlet passages 56, each extending through the dovetail 52 to provide internal fluid communication with the airfoil 54. It should be appreciated that the dovetail 52 is shown in cross-section, such that the inlet passages 56 are housed within the body of the dovetail 52.

The airfoil 54 includes a tip 60 and a root 62 defining a span-wise direction therebetween. The platform 64 is located between the dovetail 52 and the airfoil 54 and the airfoil 54 extends from the platform 64 at the root 62. The platform 64 includes an exterior surface 58 as the surface confronting the mainstream airflow of the turbine engine 10 (FIG. 1). The platform 64 helps to radially contain the turbine engine 10 mainstream airflow. Additionally, the airfoil 54 includes an outer wall 66 including a pressure side 68 and a suction side 70. The airfoil 54 includes a leading edge 72 and a trailing edge 74 to define a chord-wise direction therebetween.

At least one cooling conduit 76 is formed within the blade 30. The cooling conduit 76 is fluidly coupled to the inlet passages 56 via a supply inlet 78. The number of cooling holes 80 formed in the outer wall 66 and fluidly connect the cooling conduit 76 to an exterior surface 82 of the outer wall 66 may vary.

In operation, a hot fluid flow H, such as a combustor flow, passes along the exterior surface 82 of the blade 30. A cooling fluid flow C is fed to the inlet passages 56 and flow into the cooling conduit 76 via the supply inlet 78 to cool the airfoil 54. The cooling fluid flow C is provided throughout the airfoil 54 and exhausted from the cooling conduit 76 via the cooling holes 80 as a cooling film. The leading edge 72 of the airfoil 54 is defined by a stagnation point with respect to the hot fluid flow H.

The dovetail 52 is configured to mount to the disk 32 (FIG. 2) of the turbine engine 10 in order to rotatably drive the blade 30. Materials used to form the blade assembly 50 include, but are not limited to, steel, refractory metals such as titanium, or superalloys based on nickel, cobalt, or iron, ceramic matrix composites, or combinations thereof. The structures can be formed by a variety of methods, including additive manufacturing, casting, electroforming, or direct metal laser melting, in non-limiting examples.

The hot fluid flow H passes along the blade 30. The hot fluid flow H flows generally in the axial direction, from forward to aft, while the local directionality can vary as the fluid flow H is driven or turned by blades or vanes.

Figure 4:
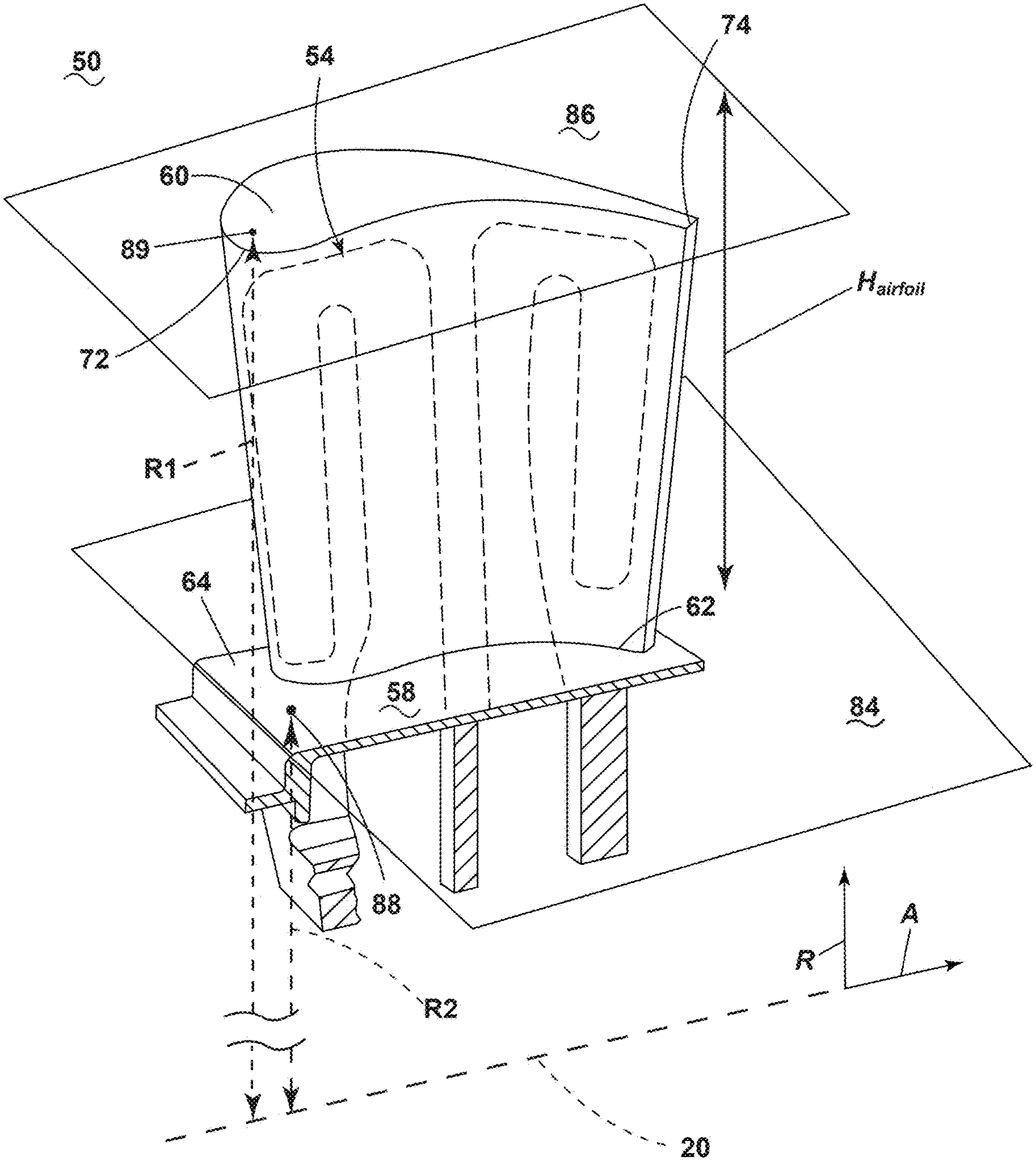
FIG. 4 is the perspective view of the blade assembly from FIG. 3 in relation to an engine centerline for the gas turbine engine of FIG. 1, in accordance with an exemplary embodiment of the present disclosure.

FIG. 4 is the same perspective view of the blade assembly 50 including the one blade 30 from FIG. 3 with some number references removed for clarity. The rotational axis (denoted A) refers to the axis about which the turbine engine 10 rotates and is aligned with the engine centerline 20 of FIG. 1. A radial axis (denoted R) refers to an axis that extends perpendicular to the rotational axis A and is aligned with a height dimension of the blade assembly 50. In a non-limiting example, the radial axis R can intersect the center of mass of the of the blade assembly 50 or the airfoil 54.

A tip point 89 is defined as a point along the tip 60. A platform point 88 is defined as a point along the exterior surface 58 of the platform 64, where the exterior surface 58 confronts the hot fluid flow H.

A platform plane 84 and a tip plane 86 are illustrated.

The tip plane 86 is a plane that intersects the tip point 89 and is arranged perpendicular to the radial axis R. The tip plane 86 is located at a first radial distance (denoted "R1") from the rotational axis A. The first radial distance R1 is measured along the radial axis R (or in the radial direction) from the rotational axis A (or a reference plane) to the tip plane 86. By way of non-limiting example, the tip point 89 is proximate the leading edge 72. However, the tip point 89 can be located anywhere along the tip 60 of the blade 30, including proximate the trailing edge 74 in a non-limiting example.

The platform plane 84 is a plane that includes the platform point 88 and is arranged parallel to the tip plane 86. A second radial distance (denoted "R2") is measured from the rotational axis A to the platform plane 84 along the radial axis R or in the radial direction. For example, the platform plane 84 is adjacent the root 62 of the blade 30.

An airfoil height (denoted "$H_{airfoil}$") is a distance measured between the platform plane 84 and the tip plane 86. The airfoil height $H_{airfoil}$ represents the height of the airfoil 54. The airfoil height $H_{airfoil}$ is equal to the second distance R2 subtracted from the first distance R1: $H_{airfoil}$=R2−R1.

The larger the airfoil height $H_{airfoil}$ the more cooling holes 80 can fit on the blade 30. It was found during testing that blades 30 with an airfoil height $H_{airfoil}$ of less than 73.7 millimeters (2.9 inches) are too small to provide necessary work extraction and clearance control, and that blades 30 with a height of greater than 86.4 millimeters (3.4 inches) would require a significant redesign of neighboring turbine components and would have higher stress imparted on the blade 30. The airfoil height $H_{airfoil}$ may be the same as the airfoil span. In other words, the span-wise direction and the radial direction can be aligned.

Figure 5:
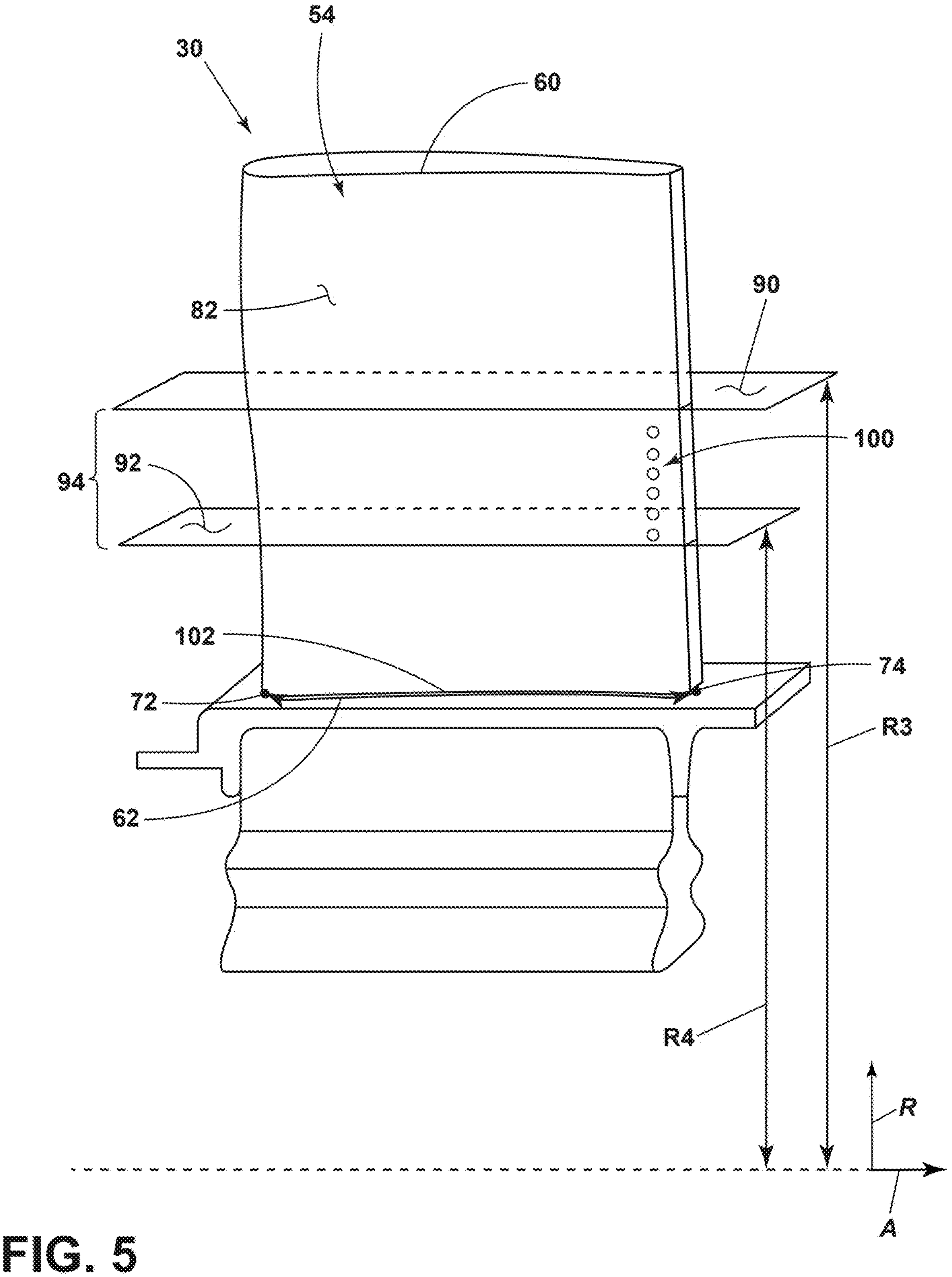
FIG. 5 is a pressure-side view of an airfoil of the blade assembly of FIG. 2, in accordance with an exemplary embodiment of the present disclosure.

Turning to FIG. 5, a pressure side view of the blade 30 is illustrated, where the radial axis R is generally up and down on the page and the rotational axis A is generally left to right.

A first radial plane 90 is located at a third radial distance (denoted "R3") from the rotational axis A. The third radial distance is equal to 0.369 meters (14.54 inches). A second radial plane 92 is located at a fourth radial distance (denoted "R4") from the rotational axis A. The fourth radial distance is equal to 0.353 meters (13.91 inches). The first and second radial planes 90, 92 are parallel to the platform plane 84 and the tip plane 86 (FIG. 4). The first and second radial planes 90, 92 are perpendicular to the radial axis R.

A mid-region 94 is defined as a region of the pressure side of the airfoil 54 that is located between the first radial plane 90 and the second radial plane 92. Cooling holes 100 are located in the mid-region 94.

Figure 6:
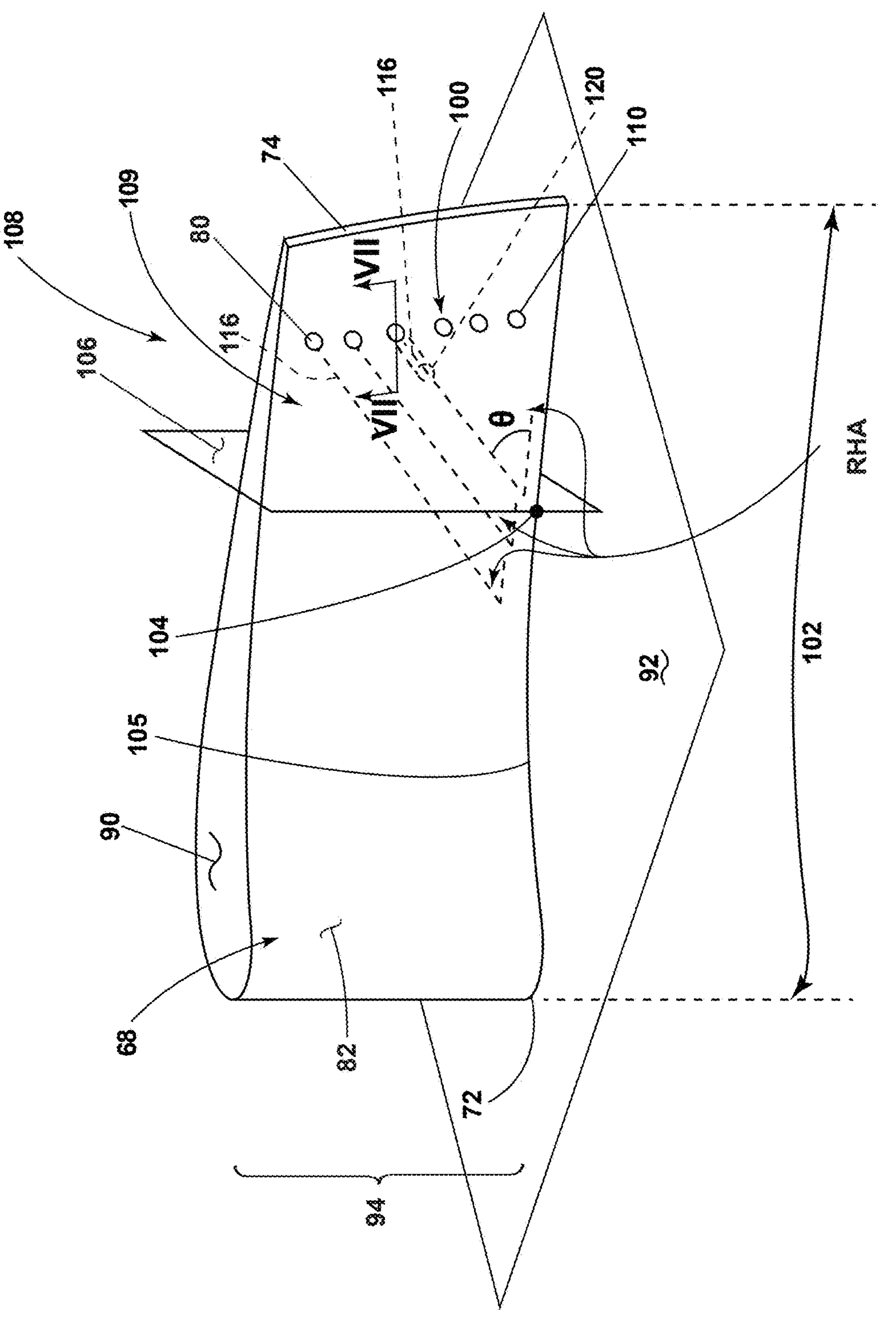
FIG. 6 is a perspective view of an overlapping region of the blade from FIG. 3, in accordance with an exemplary embodiment of the present disclosure.

FIG. 6 is a perspective view of the mid-region 94 of the airfoil 54. A blade curve 105 is defined as a line of intersection between the exterior surface 82 of the pressure side 68 of the airfoil 54 and the second radial plane 92. The blade curve 105 extends between the leading edge 72 and the trailing edge 74. A curve length 102 is defined as a length along the blade curve 105.

A curve point 104 is located at a distance from the leading edge 72 along the blade curve 105. The distance from the leading edge 72 is 68% of the curve length 102, where 0% represents a position at the leading edge 72 and 100% represents a position at the trailing edge 74.

An aft plane 106 includes the curve point 104. The aft plane 106 is defined perpendicular to the second radial plane 92 and perpendicular to the blade curve 105 at the curve point 104.

An aft region 108 is defined areas a region of the pressure side of the blade 30 that is located between the aft plane 106 and the trailing edge 74.

An overlapping region 109 is defined as the region of the pressure side of the airfoil 54 that is common to both the aft region 108 and the mid-region 94. The cooling holes 100 are located within the overlapping region 109 of the blade 30.

Figure 7:
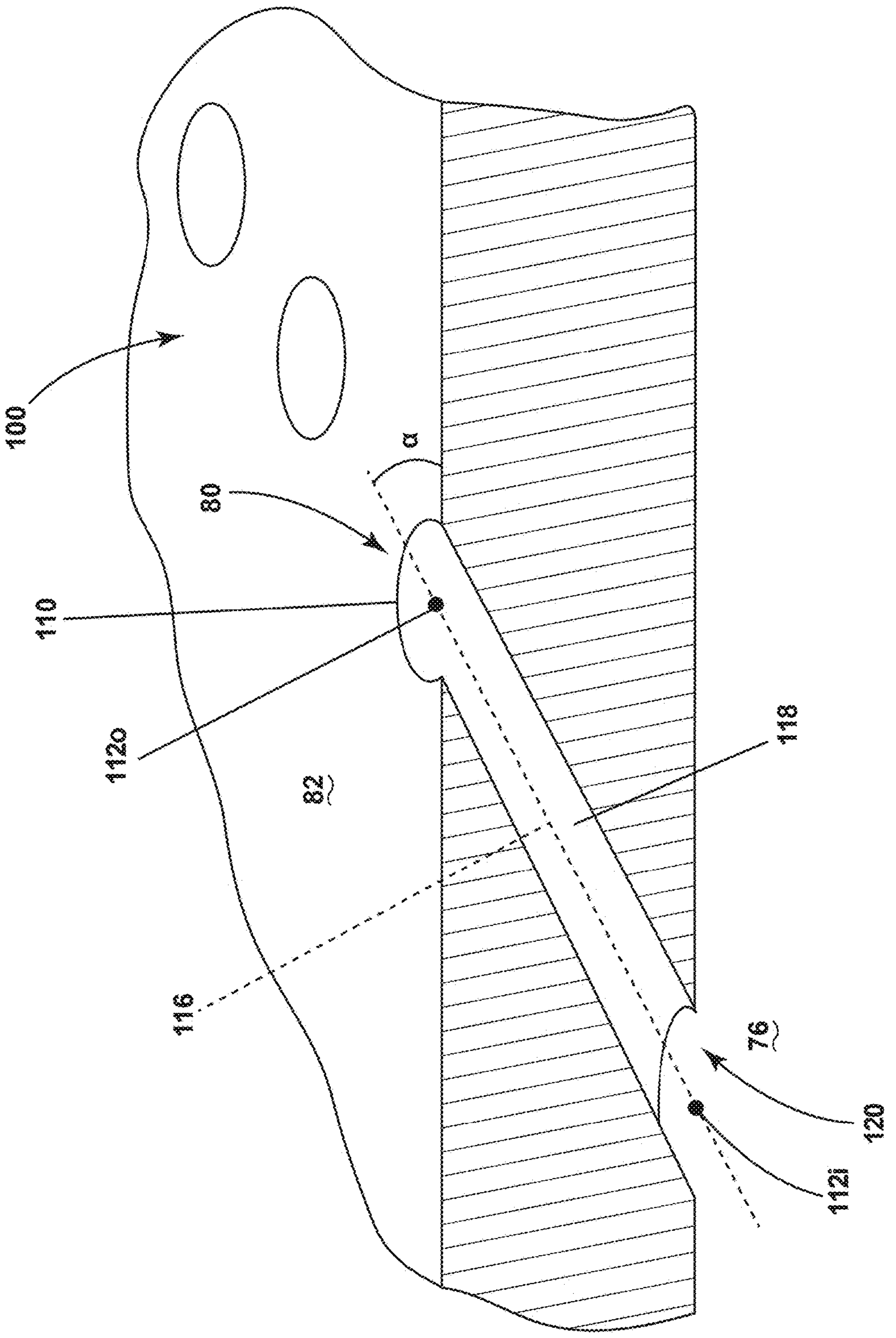
FIG. 7 illustrates a schematic cross-sectional perspective view of cooling holes from the overlapping region along line VII-VII of FIG. 6.

FIG. 7 illustrates a schematic cross-sectional perspective view of the cooling holes 100 along line VII-VII. Each cooling hole 80 includes a cooling passage 118 that extends between an inlet 120 and an outlet 110. Each cooling hole 80 is fluidly coupled to the cooling conduit 76 (FIG. 3). Each outlet 110 defines a center **112*o* and each inlet 120 defines a center 112*i*. Each cooling hole 80 includes a passage centerline 116. The passage centerline 116 extends from the second radial plane 92 (FIG. 6) through the centers 112*o*, 112*i* (FIG. 7**).

Referring again to FIG. 6, for each cooling hole 80, a radial hole angle (denoted RHA) is defined as an included angle θ between the second radial plane 92 and the passage centerline 116. For example, the angle θ is between the passage centerline 116 and the projection of the passage centerline 116 onto the second radial plane 92. The radial hole angles RHA of the cooling holes 100 in the overlapping region 109 can be the same or different.

A radial hole angle average $RHA_{avg}$ is defined as the average of the radial hole angles RHA of all of the cooling holes 100 in the overlapping region 109.

A radial hole angle minimum $RHA_{min}$ is defined as the smallest of the radial hole angles RHA of all of the cooling holes 100 in the overlapping region 109.

Referring again to FIG. 7, the passage centerline 116 for each cooling hole 80 defines a surface angle α as an angle between the exterior surface 82 at the outlet 110 and the passage centerline 116. The surface angle α ranges from 15° to 35° for the cooling holes 100.

Designing a turbine blade is generally a very labor intensive and time-consuming processes that involves careful consideration of the inter-related aerodynamic, thermal, and mechanical factors that influence blade performance (e.g., specific fuel consumption impact). Turbine blades are assessed for durability, ruggedness, and reliability to be able to perform in harsh environments and over a wide range of environmental conditions. Numerous studies are used evaluate the combined influences of aero performance, thermal and mechanical strain on a blade. These studies test durability by subjecting blades to thousands of cycles. The process is, in large part, experimental given the combined and complex influencing factors producing stress concentrations in a part.

The inventors have found solutions that improve durability in the overlapping region 109 while remaining within the constraints of existing engine systems. This is a labor and time intensive process because the process is iterative. The process involves the selection of particular dimensions designed for operating within current engine systems, running tests to determine the stresses associated with particular iterations, and evaluating whether stresses are maintained during operating cycles. If stresses are maintained, the process is repeated to further reduce or decrease local stresses, or to move stress paths by varying local geometries.

Blades are typically selected according to a size, type, etc., that satisfies three key requirements: sizing to existing engine systems, acceptable stress levels, and acceptable stress load paths. Then cooling holes are selected for the overlapping region 109 to determine impact on blade stresses, and are repeatedly redesigned until the re-designed cooling holes and selected blade together satisfy all three key requirements.

In light of this design practice, the inventors found solutions with relatively high blade durability (e.g., absence of crack formation or propagation after a number of engine cycles) for a defined engine environment. Table 1 below illustrates examples of turbine engines 10 and blade assemblies 30 with relatively high durability.

$RHA_{min}$ affects the film cooling, thereby influencing local stresses. The radial hole angle minimum $RHA_{min}$ represents an angle that is nearest to a perpendicular arrangement. As described above, a perpendicular arrangement was found to result in a relatively larger stress as compared to a cooling hole with a larger angle orientation.

The airfoil height $H_{airfoil}$ impacts how many cooling holes can fit on the blade and, in turn, the overall stress that a blade endures. The taller the blade (greater airfoil height $H_{airfoil}$) for a given rotational speed N2, the higher the stresses will be in the blade at lower radial spans due to more weight above the cooling holes.

A combination of the exhaust gas temperature (EGT), the rotational speed (N2), the orientation of the cooling holes 100 in the overlapping region 109 and the airfoil height $H_{airfoil}$ yields a blade assembly with relatively high durability.

TABLE 1

| Parameter: | Element: | Ex. 1 | Ex. 2 | Ex. 3 | Ex. 4 | Ex. 5 | Units |
|---|---|---|---|---|---|---|---|
| $H_{airfoil}$ | Airfoil Height | 73.7 | 81.3 | 78.7 | 86.4 | 84.9 | mm |
| $RHA_{avg}$ | Average Radial Hole Angle | 21.4 | 47.1 | 28.2 | 63.7 | 59.2 | degrees (°) |
| $RHA_{min}$ | Minimum Radial Hole Angle | 21.4 | 20.1 | 28.2 | 29.7 | 44.9 | degrees (°) |
| EGT | Exhaust Gas Temperature | 980.1 | 985.1 | 1059.4 | 1047.6 | 1058.6 | degrees Celsius ° C. |
| N2 | Rotational Speed | 13980.5 | 13960.6 | 12511 | 12543.2 | 12524.7 | RPM |

The solutions are represented by values for parameters that in combination result in relatively high blade durability in an engine environment.

The high pressure turbine 26 (FIG. 1) of the turbine engine 10 (FIG. 1) operates at high temperatures and rotates at high angular velocities generating stress on the rotating blades 30 (FIG. 1). Both the extreme temperature environment and the high rotational speeds are primary contributors to relatively high stress levels in turbine blades.

The engine exhaust gas temperature EGT affects the overall temperature on the blade. The higher the temperature for a given stress, the weaker the material from which the blade is formed becomes, making the blade more prone to failure.

At the overlapping region 109, a stress field is defined during operation of the turbine engine 10 by centrifugal forces that are generally in a radial direction away from the disk 32 of the blade assembly 50. The inventors found that cooling holes in the overlapping region 109 that extend in a generally perpendicular direction in relationship to the stress field are subject to higher local stresses or stress concentrations. The angled orientation of the cooling holes and related higher stresses can lead to deformation, such as cooling hole cracking, over time. Deformation may result in unintended engine removals that limit engine time on wing (TOW). This deformation was not predicted for earlier developed designs.

The radial hole angle average $RHA_{avg}$ influences the temperature of the blade because the $RHA_{avg}$ affects the film cooling on the blade. The temperature affects local stress. Further the radial hole angle average $RHA_{avg}$ influences peak stresses within the part because of how the radial hole angle average $RHA_{avg}$ interacts with the remainder of the airfoil, and in turn, the local stress concentrations. A relatively larger radial hole angle average $RHA_{avg}$ reduces the net stresses across the cooling holes within the overlapping region.

The radial hole angle minimum $RHA_{min}$ influences temperature on the part because the radial hole angle minimum $RHA_{min}$ affects the film cooling, thereby influencing local stresses.

A relatively high radial hole minimum $RHA_{min}$ and radial hole angle average $RHA_{avg}$ among the cooling holes 100 in the overlapping region 109 produces a relatively low amount of local stress in the overlapping region 109. Radial hole minimum $RHA_{min}$ and radial hole angle average $RHA_{avg}$ are also selected to achieve cooling performance. Limiting the airfoil height $H_{airfoil}$ decreases the amount of centrifugal forces imparted on the blade 30.

Relationships between the parameters are represented as expressions EQ1 and EQ2. A first Expression, referred to herein as "EQ1", is defined as Expression (1):

$$EQ1 = \left(\left(\frac{RHA_{avg}}{15°}\right) + 3.75\left(\frac{H_{airfoil}(\text{mm})}{73.7\text{ mm}}\right)^3\right)\left(1.7 \times \frac{EGT(°\text{ C.})}{1000°\text{ C.}}\right)\left(1.2 \times \frac{13{,}000\text{ RPM}}{N2(\text{RPM})}\right). \quad (1)$$

where $RHA_{avg}$ is the average radial hole angle for all the cooling holes 100 in the overlapping region 109; $H_{airfoil}$ is the height of the airfoil 54; N2 is the rotational speed of the turbine engine 10 as defined herein, above; and EGT is the exhaust gas temperature for the turbine engine 10 as defined herein, above.

A second Expression, referred to herein as "EQ2", is defined as Expression (2):

$$EQ2 = \left(\frac{RHA_{min}}{30°}\right)\left(\frac{EGT(°\text{ C.})}{1000°\text{ C.}}\right)\left(\frac{13{,}000\text{ RPM}}{N2(\text{RPM})}\right). \quad (2)$$

where $RHA_{min}$ is the smallest value for the radial hole angle among all the cooling holes in the overlapping region 109; N2 is the rotational speed of the turbine engine 10 as defined herein, above; and EGT is the exhaust gas temperature for the turbine engine 10 as defined herein, above.

Values for the expressions for each of the examples are provided in Table 2.

TABLE 2

| Parameter | Element | Ex. 1 | Ex. 2 | Ex. 3 | Ex. 4 | Ex. 5 | Units |
|---|---|---|---|---|---|---|---|
| $H_{airfoil}$ | Airfoil Height | 73.7 | 81.3 | 78.7 | 86.4 | 84.9 | mm |
| $RHA_{avg}$ | Average Radial Hole Angle | 21.4 | 47.1 | 28.2 | 63.7 | 59.2 | degrees (°) |
| $RHA_{min}$ | Minimum Radial Hole Angle | 21.4 | 20.1 | 28.2 | 29.7 | 44.9 | degrees (°) |
| EGT | Exhaust Gas Temperature | 980.1 | 985.1 | 1059.4 | 1047.6 | 1058.6 | degrees Celsius ° C. |
| N2 | Rotational Speed | 13980.5 | 13960.6 | 12511 | 12543.2 | 12524.7 | RPM |
| EQ1 | Expression 1 | 9.87 | 15.53 | 14.33 | 22.7 | 21.7 | n/a |
| EQ2 | Expression 2 | 0.65 | 0.61 | 1.04 | 1.08 | 1.64 | n/a |

Ranges for the parameters and the expressions are provided in Table 3.

TABLE 3

| Parameter: | Engine Element: | Min: | Max: | Units: |
|---|---|---|---|---|
| $H_{airfoil}$ | Airfoil Height | 73.7 | 86.4 | mm |
| $RHA_{avg}$ | Average Radial Hole Angle | 21.4 | 63.7 | degrees |
| $RHA_{min}$ | Minimum Radial Hole Angle | 20.1 | 44.9 | degrees |
| EGT | Exhaust Gas Temperature | 980.1 | 1059.4 | degrees Celsius (° C.) |
| N2 | Rotational Speed | 12511 | 13980.5 | RPM |
| EQ1 | Expression 1 | 9.87 | 22.7 | n/a |
| EQ2 | Expression 2 | 0.61 | 1.64 | n/a |

The ranges associated with EQ1 and EQ2 identify the blade designs of Table 1 that have relatively high durability for the particular engine environment and at the same time do not make sacrifices in terms of weight, aerodynamic performance, and efficiency. EQ1 ranges from 9.87 to 22.7, and EQ2 ranges from 0.61 to 1.64.

In particular, the blade designs of Table 1 have relatively high durability in the overlapping region 109. The improved durability increases the life of the blade 30, which decreases required maintenance and costs, while increasing overall engine reliability and time one wing (TOW).

Designs outside the ranges of EQ1 and EQ2 have been found to have relatively low durability for the particular engine environment. In particular, such designs have relatively low durability in the overlapping region. Lower durability results in less time on wing (TOW) and greater maintenance costs.

Additionally or alternatively, designs outside the ranges of EQ1 and EQ2 may attempt to increase durability by making sacrifices in terms of weight, aerodynamic performance, and efficiency. For example, the standard practice for solving the problem of improving blade assembly durability has been to utilize stronger material. However, such materials lead to increased costs, system weight, and overall space occupied by the blade. Using a cost-benefit analysis, the overall engine efficiency is reduced and related components must be redesigned to compensate for the use of stronger materials. In some cases, this result of such a cost-benefit analysis is impractical or impossible. Therefore, a solution for reducing stresses located at cooling holes within airfoils presently used in existing engines is needed, without requiring redesign of related components or without sacrificing overall engine efficiency.

In other examples, increasing size of the airfoil or related components, utilizing stronger material, and/or providing additional cooling features can combat centrifugal and thermal stresses. However, such increased size, stronger materials, and additional cooling features can lead to increased costs, system weight, overall space occupied by the blade, and performance loss, as well as increased local stresses at the cooling holes due to increased weight and size relating to the centrifugal forces. Increased cooling features results in a relatively less amount of material utilized, which can result in an increase in local stresses at the cooling holes. Therefore, a solution for reducing stresses at the cooling holes is needed without otherwise increasing stresses, weight, size, or decreasing engine efficiency.

On the contrary, the inventors have found that the examples of Table 1 provide successful solutions without the need to increase thickness, weight, strength, or the number of cooling features. The examples of Table 1 result in EQ1 values ranging from 9.87 to 22.7 and EQ2 values ranging from 0.61 to 1.64 and achieve increased durability without penalties to size, weight, strength, or stress through the use of additional cooling features.

In other words, rather than making areas of the airfoil or the overlapping region thicker, or using heavier, stronger materials, or adding additional cooling features, effective stress reduction can be achieved by the examples of Table 1.

To the extent one or more structures provided herein can be known in the art, it should be appreciated that the present disclosure can include combinations of structures not previously known to combine, at least for reasons based in part on conflicting benefits versus losses, desired modes of operation, or other forms of teaching away in the art.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

A turbine engine, comprising: an engine core configured to generate an exhaust gas temperature (EGT) in a range of 980.1 and 1059.4 degrees Celsius (° C.) and a rotational speed (N2) in a range of 12511 to 13980.5 RPM, the engine core extending along an engine centerline and including: a compressor section; a combustor; and a turbine section, the turbine section including a blade assembly configured to rotate about the engine centerline at the rotational speed (N2), wherein a radial axis is perpendicular to the engine centerline and aligned with a height dimension of the blade assembly, the blade assembly comprising: a platform defining a platform plane; an airfoil extending from the platform, the airfoil including: a pressure side and a suction side and an exterior surface; a leading edge and a trailing edge; a root; a tip defining a tip plane; a cooling conduit; a plurality of cooling holes in an overlapping region of the pressure side of the blade; wherein an airfoil height ($H_{airfoil}$) is defined as a radial distance measured from the platform plane to the tip plane, wherein the airfoil height is in a range of 73.7 to 86.4 millimeters; wherein the overlapping region of the pressure side of the blade is defined by: a mid-region, wherein the mid-region is a region of the pressure side of the airfoil between a first radial plane and a second radial plane, wherein the first radial plane is arranged parallel to the tip plane and located at a first radial distance from the engine centerline, wherein the second radial plane is arranged parallel to the tip plane and located at a second radial distance from the engine centerline, and wherein the first radial distance is 0.369 meters (14.54 inches) and the second radial distance is 0.353 meters (13.91 inches); and an aft region, wherein the a blade curve is defined as a line of intersection between the exterior surface of the pressure side and the second radial plane, wherein the blade curve extends between the leading edge and the trailing edge, wherein a curve point is defined at a distance of 68% of a length of the blade curve from the leading edge along the blade curve; wherein an aft plane includes the curve point, is perpendicular to the second radial plane, and is perpendicular to the pressure side of the blade curve at the curve point, wherein the aft region is a region of the pressure side of the blade that is located between the aft plane and the trailing edge; wherein each cooling hole in the plurality of cooling holes includes a cooling passage, each cooling passage extending between an inlet fluidly coupled to the cooling conduit and an outlet open to the exterior surface, the cooling passage defining a passage centerline; wherein each cooling hole in the plurality of cooling holes includes a radial hole angle (RHA) defined between the second radial plane and the respective passage centerline; wherein a radial hole angle average ($RHA_{avg}$) is defined as an average of the radial hole angles (RHAs) for all cooling holes in the overlapping region, wherein the radial hole angle average ($RHA_{avg}$) is in the range of 21.4 to 63.7 degrees; and wherein a minimum radial hole angle ($RHA_{min}$) is defined as a smallest radial hole angle of all the radial hole angles in the plurality of cooling holes, wherein the minimum radial hole angle ($RHA_{min}$) is in the range of 20.1 to 44.9 degrees; wherein the exhaust gas temperature (EGT), the rotational speed (N2), the airfoil height ($H_{airfoil}$), and the radial hole angle average ($RHA_{avg}$), define a first value (EQ1) by the following expression:

$$EQ1 = \left(\left(\frac{RHA_{avg}}{15^\circ}\right) + 3.75\left(\frac{H_{airfoil}(\text{mm})}{73.7\text{ mm}}\right)^3\right)\left(1.7 \times \frac{EGT(^\circ\text{C.})}{1000^\circ\text{C.}}\right)\left(1.2 \times \frac{13{,}000\text{ RPM}}{N2(\text{RPM})}\right),$$

wherein the exhaust gas temperature (EGT), the rotational speed (N2), and the minimum radial hole angle ($RHA_{min}$), define a second value (EQ2) by the following expression:

$$EQ2 = \left(\frac{RHA_{min}}{30^\circ}\right)\left(\frac{EGT(^\circ\text{C.})}{1000^\circ\text{C.}}\right)\left(\frac{13{,}000\text{ RPM}}{N2(\text{RPM})}\right),$$

and wherein the first value (EQ1) is in the range of 9.87 to 22.7, and the second value (EQ2) is in the range of 0.61 to 1.64.

The turbine engine of any preceding clause, wherein the tip plane and the platform plane are parallel to one another.

The turbine engine of any preceding clause, wherein the tip plane, the platform plane, the first radial plane, and the second radial plane are perpendicular to the radial axis.

The turbine engine of any preceding clause, wherein 0% of the blade curve is defined at the leading edge and 100% of the blade curve is defined at the trailing edge.

The turbine engine of any preceding clause, wherein the passage centerline is a longitudinal axis of a respective one of the plurality of cooling holes.

The turbine engine of any preceding clause, wherein the passage centerline extends through a center of an inlet and a center of an outlet of a respective one of the plurality of cooling holes.

The turbine engine of any preceding clause, wherein the radial hole angle (RHA) is an angle between the passage centerline and a projection of the passage centerline onto the second radial plane.

The turbine engine of any preceding clause, wherein the exhaust gas temperature (EGT) is a redline or maximum permitted takeoff temperature documented in a Federal Aviation Administration ("FAA") type certificate data sheet.

The turbine engine of any preceding clause, where rotational speed (N2) is a redline or maximum permitted takeoff rotational speed of the turbine engine as documented in an FAA-type certificate data sheet.

The turbine engine of any preceding clause, wherein the platform plane includes a platform point on an exterior surface of the platform and is perpendicular to the radial axis.

The turbine engine of any preceding clause, wherein the platform point is on the exterior surface of the platform that is configured to confront a mainstream airflow of the turbine engine.

The turbine engine of any preceding clause, wherein the platform plane is adjacent the root of the airfoil.

The turbine engine of any preceding clause, wherein the tip plane is defined as a plane including a tip point on the tip of the airfoil and is perpendicular to the radial axis.

The turbine engine of any preceding clause, wherein the radial axis intersects the center of mass of the blade assembly or the airfoil.

What is claimed is:

1. A turbine engine, comprising:

an engine core configured to generate an exhaust gas temperature (EGT) in a range of 980.1 and 1059.4 degrees Celsius (° C.) and a rotational speed (N2) in a range of 12511 to 13980.5 RPM, the engine core extending along an engine centerline and including:

a compressor section;

a combustor; and a turbine section, the turbine section including a blade assembly configured to rotate about the engine centerline at the rotational speed (N2), wherein a radial axis is perpendicular to the engine centerline and aligned with a height dimension of the blade assembly, the blade assembly comprising:

a platform defining a platform plane;

an airfoil extending from the platform, the airfoil including:

a pressure side and a suction side and an exterior surface;

a leading edge and a trailing edge;

a root;

a tip defining a tip plane;

a cooling conduit;

a plurality of cooling holes in an overlapping region of the pressure side of the blade;

wherein an airfoil height ($H_{airfoil}$) is defined as a radial distance measured from the platform plane to the tip plane, wherein the airfoil height is in a range of 73.7 to 86.4 millimeters;

wherein the overlapping region of the pressure side of the blade is defined by:

a mid-region, wherein the mid-region is a region of the pressure side of the airfoil between a first radial plane and a second radial plane, wherein the first radial plane is arranged parallel to the tip plane and located at a first radial distance from the engine centerline, wherein the second radial plane is arranged parallel to the tip plane and located at a second radial distance from the engine centerline, and wherein the first radial distance is 0.369 meters and the second radial distance is 0.353 meters; and an aft region, wherein the a blade curve is defined as a line of intersection between the exterior surface of the pressure side and the second radial plane, wherein the blade curve extends between the leading edge and the trailing edge, wherein a curve point is defined at a distance of 68% of a length of the blade curve from the leading edge along the blade curve; wherein an aft plane includes the curve point, is perpendicular to the second radial plane, and is perpendicular to the pressure side of the blade curve at the curve point, wherein the aft region is a region of the pressure side of the blade that is located between the aft plane and the trailing edge;

wherein each cooling hole in the plurality of cooling holes includes a cooling passage, each cooling passage extending between an inlet fluidly coupled to the cooling conduit and an outlet open to the exterior surface, the cooling passage defining a passage centerline;

wherein each cooling hole in the plurality of cooling holes includes a radial hole angle (RHA) defined between the second radial plane and the respective passage centerline;

wherein a radial hole angle average ($RHA_{avg}$) is defined as an average of the radial hole angles (RHAs) for all cooling holes in the overlapping region, wherein the radial hole angle average ($RHA_{avg}$) is in the range of 21.4 to 63.7 degrees; and wherein a minimum radial hole angle ($RHA_{min}$) is defined as a smallest radial hole angle of all the radial hole angles in the plurality of cooling holes, wherein the minimum radial hole angle ($RHA_{min}$) is in the range of 20.1 to 44.9 degrees;

wherein the exhaust gas temperature (EGT), the rotational speed (N2), the airfoil height ($H_{airfoil}$), and the radial hole angle average ($RHA_{avg}$), define a first value (EQ1) by the following expression:

$$EQ1 = \left(\left(\frac{RHA_{avg}}{15^\circ}\right) + 3.75\left(\frac{H_{airfoil}(\text{mm})}{73.7\text{ mm}}\right)^3\right)\left(1.7 \times \frac{EGT(^\circ\text{ C.})}{1000^\circ\text{ C.}}\right)\left(1.2 \times \frac{13{,}000\text{ RPM}}{N2(\text{RPM})}\right),$$

wherein the exhaust gas temperature (EGT), the rotational speed (N2), and the minimum radial hole angle ($RHA_{min}$), define a second value (EQ2) by the following expression:

$$EQ2 = \left(\frac{RHA_{min}}{30^\circ}\right)\left(\frac{EGT(^\circ\text{ C.})}{1000^\circ\text{ C.}}\right)\left(\frac{13{,}000\text{ RPM}}{N2(\text{RPM})}\right),$$

and wherein the first value (EQ1) is in the range of 9.87 to 22.7, and the second value (EQ2) is in the range of 0.61 to 1.64.

2. The turbine engine of claim 1, wherein the tip plane and the platform plane are parallel to one another.

3. The turbine engine of claim 2, wherein the tip plane, the platform plane, the first radial plane, and the second radial plane are perpendicular to the radial axis.

4. The turbine engine of claim 1, wherein 0% of the blade curve is defined at the leading edge and 100% of the blade curve is defined at the trailing edge.

5. The turbine engine of claim 1, wherein the passage centerline is a longitudinal axis of a respective one of the plurality of cooling holes.

6. The turbine engine of claim 5, wherein the passage centerline extends through a center of an inlet and a center of an outlet of a respective one of the plurality of cooling holes.

7. The turbine engine of claim 1, wherein the radial hole angle (RHA) is an angle between the passage centerline and a projection of the passage centerline onto the second radial plane.

8. The turbine engine of claim 1, wherein the platform plane includes a platform point on an exterior surface of the platform and is perpendicular to the radial axis.

9. The turbine engine of claim 8, wherein the platform point is on the exterior surface of the platform that is configured to confront a mainstream airflow of the turbine engine.

10. The turbine engine of claim 9, wherein the platform plane is adjacent the root of the airfoil.

11. The turbine engine of claim 1, wherein the tip plane is defined as a plane including a tip point on the tip of the airfoil and is perpendicular to the radial axis.

12. The turbine engine of claim 1, wherein the radial axis intersects the center of mass of the blade assembly or the airfoil.

* * * * *